US006965861B1

(12) United States Patent
Dailey et al.

(10) Patent No.: US 6,965,861 B1
(45) Date of Patent: Nov. 15, 2005

(54) METHOD FOR IMPROVING RESULTS IN AN HMM-BASED SEGMENTATION SYSTEM BY INCORPORATING EXTERNAL KNOWLEDGE

(75) Inventors: Matthew N. Dailey, San Diego, CA (US); Dayne B. Freitag, La Mesa, CA (US); Chalaporn Hathaidharm, Walnut, CA (US); Anu K. Pathria, La Jolla, CA (US)

(73) Assignee: Burning Glass Technologies, LLC, San Diego, CA (US)

( * ) Notice: Subject to any disclaimer, the term of this patent is extended or adjusted under 35 U.S.C. 154(b) by 823 days.

(21) Appl. No.: 09/988,601

(22) Filed: Nov. 20, 2001

(51) Int. Cl.$^7$ .............................................. G06F 17/27

(52) U.S. Cl. .............................. 704/242; 704/1; 704/9; 715/500; 715/530; 715/531

(58) Field of Search ............................... 704/1, 9, 242; 715/500, 530, 531

(56) References Cited

U.S. PATENT DOCUMENTS 6,542,635 B1 * 4/2003 Hu et al. ..................... 382/173
2002/0165717 A1 * 11/2002 Solmer et al. ............. 248/188.7

* cited by examiner

Primary Examiner—Tālivaldis Ivars Šmits
Assistant Examiner—Minerva Rivero
(74) Attorney, Agent, or Firm—McDermott Will & Emery LLP

(57) ABSTRACT

A Hidden Markov model is used to segment a data sequence. To reduce the potential for error that may result from the Markov assumption, the Viterbi dynamic programming algorithm is modified to apply a multiplicative factor if a particular set of states is re-entered. As a result, structural domain knowledge is incorporated into the algorithm by expanding the state space in the dynamic programming recurrence. In a specific example of segmenting resumes, the factor is used to reward or penalize (even require or prohibit) a segmentation of the resume that results in the re-entry into a section such as Experience or Contact Information. The method may be used to impose global constraints in the processing of an input sequence or to impose constraints to local sub-sequences.

18 Claims, 3 Drawing Sheets

METHOD FOR IMPROVING RESULTS IN AN HMM-BASED SEGMENTATION SYSTEM BY INCORPORATING EXTERNAL KNOWLEDGE

FIELD OF THE INVENTION

The present invention relates to statistical modeling and, more particularly, to using Hidden Markov models.

BACKGROUND OF THE INVENTION

Hidden Markov models (HMMs) are a class of statistical models used in modeling discrete time-series data. Problems that naturally give rise to such data include robot navigation, machine vision, and signal processing, and HMMs are at the core of many state-of-the-art algorithms for addressing these problems. In addition, many problems of natural language processing involve time-series data and can be modeled with HMMs, including: part-of-speech tagging, topic segmentation, speech recognition, generic entity recognition, and information extraction.

The so-called Markov assumption is a fundamental simplifying assumption that lies behind the efficiency of the algorithms used to train and apply an HMM. Under the Markov assumption, the probability of a given observation in a time series is supposed to be a function of only the current state of the process that produced it. While this assumption allows modelers to use dynamic programming to set model parameters and perform inference (for a description of the algorithms used, the Viterbi algorithm and the Baum-Welch algorithm, see Rabiner, L. R., "A Tutorial on Hidden Markov Models and Selected Applications in Speech Recognition," in Proceedings of the IEEE, 1989), it is demonstrably unjustified in many application domains, including problems involving natural language processing, such as information extraction.

Two basic approaches have been used to mitigate the Markov assumption, topological manipulation and "n-gram" Markov models. By manipulating model topology, it is possible to encode a finite contextual memory into a given model state simply by restricting the set of state paths that feed into it. However, this kind of manual model structuring is unwieldy for anything but small local contexts, and enlarging the model has the negative effect of rendering the statistics kept at individual states sparser and less certain. Examples of this approach can be found in Leek, T., "Information Extraction using Hidden Markov Models," Masters Thesis, UC San Diego, 1997, and Freitag, D., and McCallum, A. K., "Information Extraction using HMMs and Shrinkage," AAAI-99 Workshop on Machine Learning for Information Extraction, AAAI Technical Report WS-99-11, 1999.

In an "n-gram" Markov model the emission distribution at a state is defined over n-grams; at each time step, a state is presumed to emit the current word conditioned on the n−1 previous words. However, this too models only local context and requires special strategies to accommodate sparse statistics. An example of this approach is Bahl, L. R., et al, "A Maximum Likelihood Approach to Continuous Speech Recognition," IEEE Transactions on Pattern Analysis and Machine Intelligence, vol. PAMI-5, pp. 179–190, 1983.

Therefore, a method is needed whereby an HMM can be made to obey long-range constraints without sacrificing all the benefits of the Markov assumption.

SUMMARY OF THE INVENTION

Hidden Markov models (HMMs) are a class of statistical models used in modeling discrete time-series data. The Markov assumption is a fundamental simplifying assumption underlying the efficiency of the algorithms used to train and apply an HMM.

The current invention relates to a method and system for encoding information that otherwise would be lost under the Markov assumption. The present system and methods involve modifying the Viterbi algorithm by applying a constraint regarding whether a particular state will be entered. An example of such a constraint is applying a penalty if a particular state or set of states is re-entered after previously having been visited. Structural domain knowledge is thus incorporated into the algorithm by expanding the state space in the dynamic programming recurrence. The present methods and system are particularly useful for tagging documents in which certain sections are unlikely to occur more than once in a given document, such as the "Experience" or "Education" section of a resume.

Another example of such a constraint is to encourage or require one or more instances of a section, when that is appropriate.

The current invention can also be used to constrain model behavior locally (that is, over sub-regions of an observation sequence) as well as globally (that is, with regard to an entire document or other observation sequence). For example, it can be used to require that any putative "Experience" section of a resume contain at least one "Job Title" field.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION

Figure 1:
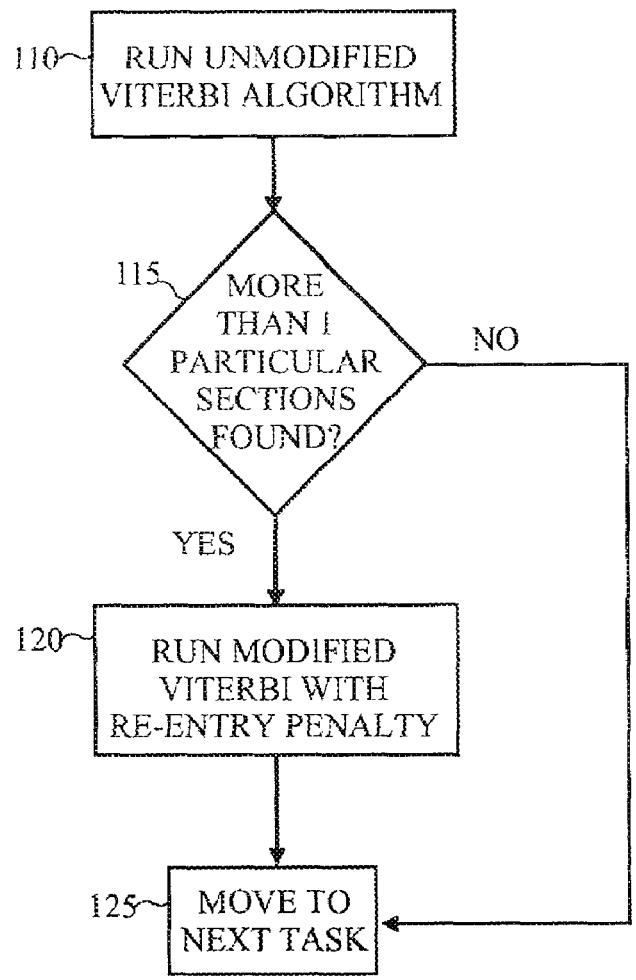
FIG. 1 illustrates a multi-pass method of segmenting documents in accordance with an embodiment of the present invention.
Figure 2:
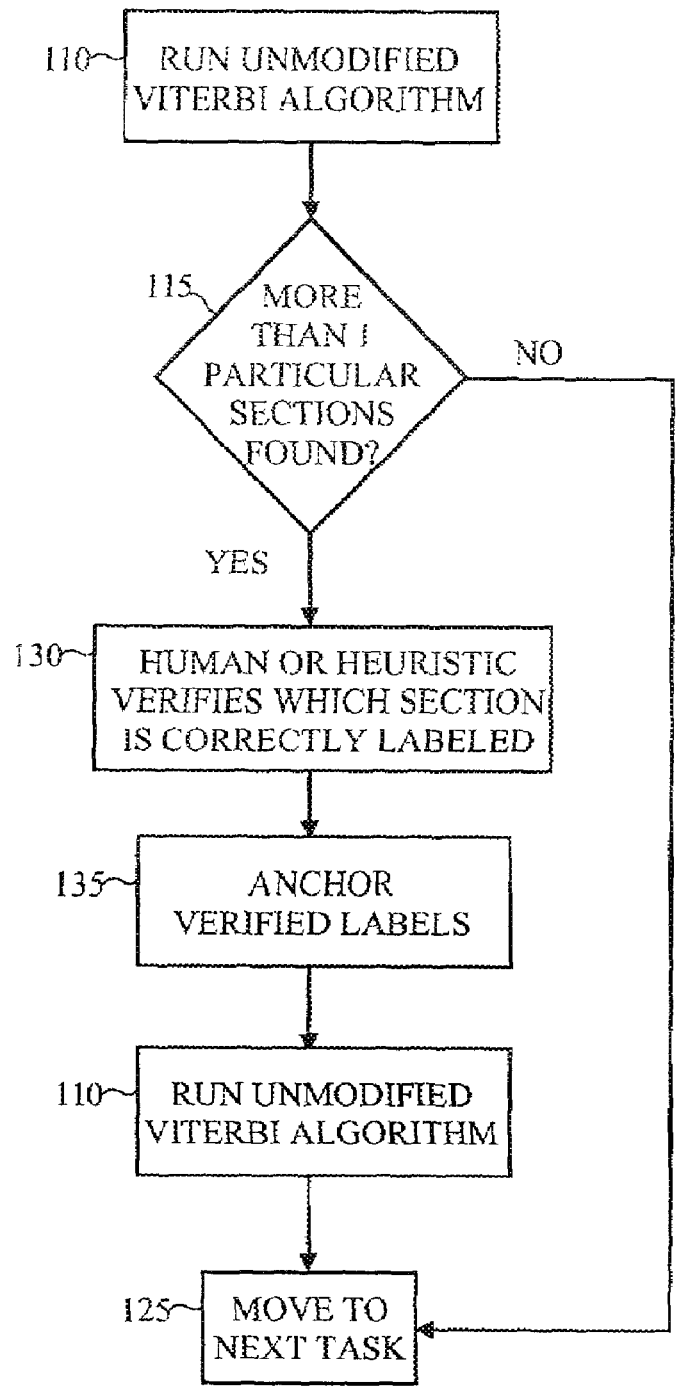
FIG. 2 illustrates segmenting documents by anchoring after verification in accordance with another embodiment of the present invention.
Figures 3A, 3B, 3C, 3D:
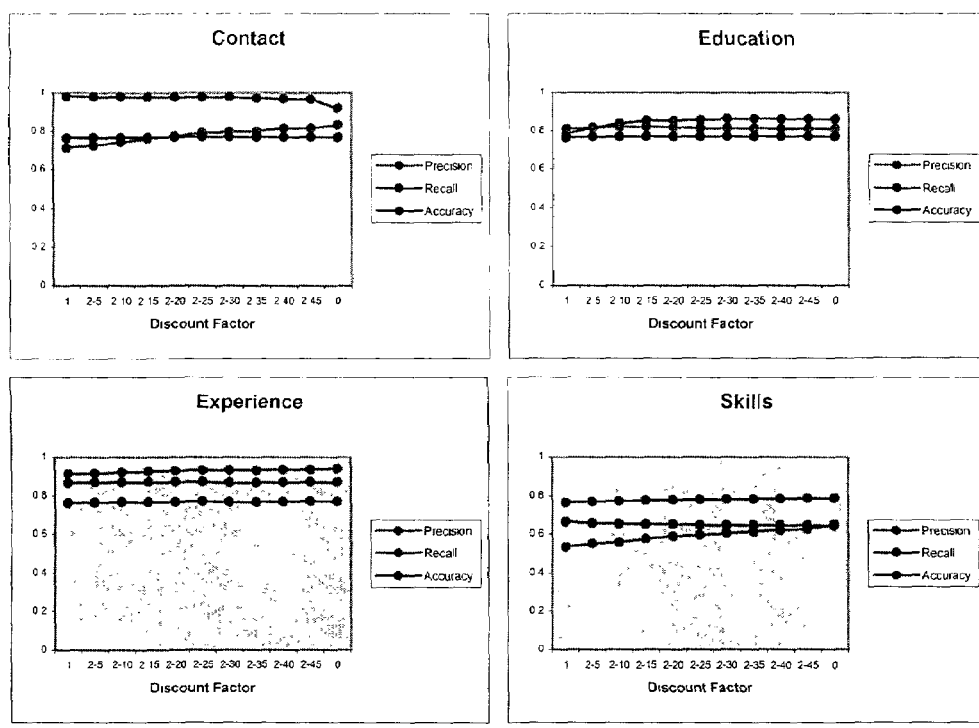
FIGS. 3A–3D illustrate comparisons of results from applying different re-entry penalties in accordance with embodiments of the present invention.

The inventive systems and methods provide for encoding information that would otherwise be lost under the Markov assumption. The method does this by expanding the state space of the Viterbi algorithm, which is invoked when applying the HMM to tag a new object. Structural domain knowledge is thus incorporated into the algorithm to track if a state or set of states has been previously visited. By means of a multiplicative factor, or "constraint," re-entry into a given set of states can be encouraged or discouraged, or even required or prohibited.

For concreteness and clarity the discussion that follows will use an exemplary environment of tagging a resume, but the use of this example is in no way intended to limit the use of the invention, which has application in the segmentation of many kinds of discrete time-series data sequences. The example disclosed will show, in particular, how to discourage multiple identifications of a given set of sections in a resume, but it can also be used to impose other kinds of constraints, such as encouraging or requiring identification of given sections, either globally or locally. In this context, "global" means the constraint is imposed on an entire observation sequence (such as a whole resume), and "local" means the constraint is imposed on a sub-region of an observation sequence (such as the experience section of a resume). In the following description, for purposes of explanation, numerous specific details are set forth in order to provide a thorough understanding of the present invention. However, it will be apparent to one schooled in the art that the present invention may be practiced without these specific details. In other instances, well-known structures and devices are shown in block diagram form in order to avoid unnecessarily obscuring the present invention.

Hidden Markov Models

A hidden Markov model is a finite state automaton with stochastic state transitions and symbol emissions. The automaton models a probabilistic generative process, whereby a sequence of symbols is produced by starting in some state, transitioning to a new state, emitting a symbol selected by that state, transitioning again, emitting another symbol, and so on. Building HMMs is well known to one of ordinary skill in the art.

The Markov Assumption

The Markov assumption is a fundamental simplifying assumption underlying the efficiency of the algorithms used to train and apply an HMM. In general terms, a process is said to be "Markovian" if its action at the current time step is a function only of its current state and does not take into account the states of previous time steps. In an HMM this means that the symbol emitted at some point in time and the state visited at the next point in time are functions only of the current state.

While this assumption allows the use of dynamic programming (DP) to set model parameters and perform inference, it is demonstrably unjustified in many application domains, including problems of natural language processing to which HMMs have been applied, such as information extraction. Previous approaches to mitigate the Markov assumption, as discussed previously, model only local context and require special strategies to accommodate sparse statistics.

In the case of resume mark-up, certain high-level sections, such as the Education, or Experience, or Contact section, are unlikely to appear more than once. The present invention addresses how to advantageously use this knowledge in a system that relies on an HMM to tag resumes. The present inventive methods include a way of modifying the Viterbi algorithm that, by expanding the state space in the recurrence equation, allows the application of a penalty if a particular state (or set of states) is re-entered after having been previously visited. If a distinct set of states is associated with each of the high-level segments of a resume, this penalty discourages or prohibits the modified Viterbi algorithm from returning a segmentation of the resume, for example, that has two distinct Education sections. Experimentation has demonstrated performance improvement in the resume mark-up application via this "re-entry penalization."

The Viterbi Algorithm

The Viterbi algorithm is an efficient dynamic programming algorithm for finding the maximum likelihood path through a trained hidden Markov model for a given input sequence of observations. HMMs employ the Markov assumption that given the current state, the emission and transition probabilities are independent of previous states. This means that the probability of moving from state j to state i and emitting symbol k at time t depends only on the state transition probability $a_{ji}$ and the probability $b_i(k)$ of emitting symbol k in state i. This assumption leads to the following dynamic programming algorithm for finding the most likely sequence of states that could have produced an observation sequence. We are given a sequence O containing T observations and a trained model with N states having emission probabilities $b_i(k)$, transition probabilities $a_{ji}$, and initial state occupation probabilities $\pi_i$, for $i,j \in \{1, \ldots, N\}$ and $k \in \{1, \ldots, T\}$. Let $\delta_t(i)$ be the likelihood of the best path through the model that produces the observed sequence $O_1, \ldots, O_t$ ending in state i, and let $\phi_t(i)$ record the actual maximum likelihood sequence. The $\delta$ and $\phi$ tables are filled in as follows:

1. For each state $i \in \{1, \ldots, N\}$,
   a. $\delta_1(i) = \pi_i \times b_1(O_1)$.
   b. $\phi_1(i) = 0$.
2. For time t=2 to T,
   a. For each state $i \in \{1, \ldots, N\}$,
      i. $\delta_t(i) = \max_{1 \leq j \leq N} \{\delta_{t-1}(j) \times a_{ji}\} \times b_i(O_t)$.
      ii. $\phi_t(i) = \text{argmax}_{1 \leq j \leq N} \{\delta_{t-1}(j) \times a_{ji}\}$.

After this algorithm is run, the maximum likelihood path is recovered by backtracking through the $\phi$ table.

The Case of Resumes

When HMMs are used to extract information from large documents containing rich structure, the most likely path through a model often fails to obey certain structural constraints. For instance, most resumes contain at most one "Education" section. Chart 1 indicates the number of occurrences of the Education and Experience sections in a pool of about 5000 resumes.

When an HMM tailored to extract information from resumes is used to obtain the most likely parse of a new test resume, the maximum likelihood path may jump into and out of the group of state (or states) associated with the Education section several times. Indeed, the distribution of the number of distinct Education and Experience sections identified in a resume by an HMM is shown below.

CHART 1

Occurrences of Education and Experience sections

| # occurrences of section in resume | Education | | Experience | |
|---|---|---|---|---|
| | Actual % | HMM % | Actual % | HMM % |
| 0 | 15.6 | 12.7 | 3.4 | 2.6 |
| 1 | 82.0 | 49.0 | 89.9 | 52.0 |
| 2 | 2.4 | 24.8 | 6.4 | 28.4 |
| 3 | <0.1 | 9.3 | 0.3 | 9.6 |
| >3 | 0 | >4.1 | <0.1 | >7.3 |

One way to alleviate this type of problem is to implement ad-hoc post-processing heuristics, but it is also possible to extend the Viterbi algorithm in a way that forces it to respect global document structure.

A Modified Viterbi Algorithm

The present inventive methods and systems still use dynamic programming, but unlike earlier attempts, enable the model designer to allow global information about the number of times the model has entered or exited a particular group of states to affect the likelihood of that path. It is to be understood that the exact algorithm disclosed here is one of many ways one skilled in the art might write the algorithm to accomplish the purpose of incorporating re-entry penalties. Different users with different applications or different preferences may write or apply the algorithm differently within the spirit and scope of the invention. For example, re-entry constraints may be applied so as to encourage multiple entries into a group of states, or re-entry penalties may be imposed on parts of the observation sequence rather than globally.

First, the model designer creates an HMM architecture designed to account for the structure of the sequences in a training collection and sets the model's transition and emission probabilities according to the usual methods for training HMMs.

Then the model designer defines a set of "re-entry groups," each of which is a set of states associated with a logical component of the type of sequences being segmented. The model designer associates a multiplicative factor with each of those groups. In one exemplary embodiment, this multiplicative factor can be a penalty associated with a re-entry group that is used to discount the likelihood of paths that enter re-entry groups more than once, thereby encouraging paths that do not enter re-entry groups multiple times.

The $\delta$ and $\phi$ DP tables are modified in the following way: A variable $G_k$ for each re-entry group k is used to denote the current number of entries into that group. A set of values for these $G_k$ variables are collected into a "re-entry state" G. At each point in DP, whether each given re-entry group has been entered 0, 1, or more than 1 time is determined. So for each observation $O_t$, in the observation sequence and each state i in the model, the re-entry state G can take on $3^{|G|}$ possible values. Thus the $\delta$ and $\phi$ tables must contain entries for each of these possible values of G at each state and time, denoted $\delta_t(i,G)$ and $\phi_t(i,G)$.

Let $G^0$ be the re-entry state consisting of 0's for all re-entry groups, and let $G^k$ be the re-entry state consisting of 0's for all re-entry groups except group k and a 1 for group k. The modified Viterbi algorithm is:

1. For each state $i \in \{1, \ldots, N\}$,
   a. If state i is in re-entry group k,
      i. $\delta_1(i,G^k) = \pi_i \times b_1(O_1)$; for all $G \neq G^k$, $\delta_1(i,G) = 0$.
      ii. For all G, $\phi_1(i,G) = 0$.
   b. Otherwise (state i is not in any re-entry group)
      i. $\delta_1(i,G^0) = \pi_i \times b_1(O_1)$; for all $G \neq G^0$, $\delta_1(i,G) = 0$.
      ii. For all G, $\phi_1(i,G) = 0$.
2. For time t=2 to T,
   a. For each state $i \in \{1, \ldots, N\}$,
      1. For each re-entry state G,
         a) $\delta_t(i,G) = \max_{1 \leq j \leq N} \{\delta_{t-1}(j,G') \times a_{ji} \times d(G',i,j)\} \times b_i(O_t)$.
         b) $\phi_t(i,G) = \text{argmax}_{1 \leq j \leq N} \{\delta_{t-1}(j) \times a_{ji} \times d(G',i,j)\}$.

The re-entry state G' in the $\delta$ update rule is the re-entry state in HMM state j that would have led to re-entry state G when moving from HMM state j to HMM state i. The extension of re-entry state G' in HMM state j to re-entry state G in HMM state i can be defined as follows:

1. If i is not a member of a re-entry group, G=G'.
2. Otherwise, let g(i) be the re-entry group for state i.
3. If g(i)=g(j) then G=G'.
   a. If g(i)≠g(j) and $G'_{g(i)}=2$, then G=G' (there is no need to keep track of more than two entries to each re-entry group).
   b. Otherwise (g(i)≠g(j) and $G'_{g(i)}<2$), G is derived from G' by incrementing $G'_{g(i)}$.

d(G',i,j) is the multiplicative factor that applies when moving from HMM state j and re-entry state G' to HMM state i. This function returns 1 (no effect) if state i is not a member of a re-entry group, if state i and j are members of the same re-entry group, or if G' indicates that state i's re-entry group has not been previously entered. Otherwise, in the exemplary embodiment, it is a multiplicative re-entry penalty, $0 \leq d < 1$. To encourage re-entry, the multiplicative factor can be set such that d>1. In a preferred embodiment, the value of d can vary according to the number of times a group has been re-entered. In this manner, the modified Viterbi algorithm can not only penalize any re-entry but, alternatively, encourage re-entry (a particular number of times) as appropriate to its intended application.

The above discussion describes a method by which re-entry constraints are applied globally, but it is readily apparent to one schooled in the art how they might be applied locally to fragments of the observation sequence.

Empirical Results

As a test of the re-entry penalization approach, a simple nine-state, fully interconnected HMM was trained to segment resumes into the following top-level sections: Contact, Objective, Summary, Education, Experience, Skills, Professional, and Statements.

One HMM state was associated with each of the eight top-level sections, and the ninth "background" state was used to account for unlabeled portions of resumes. The model's transition probabilities and emission probabilities were trained with the standard Baum-Welch algorithm on 3935 resumes that had been hand-tagged for the above eight sections. The Viterbi algorithm was then run to find the maximum likelihood path through the model for 200 randomly selected test resumes that had not been used in training. The model obtained the following performance on this test set:

CHART 2

| Section | Precision | Recall |
| --- | --- | --- |
| Contact | 0.714 | 0.980 |
| Objective | 0.603 | 0.713 |
| Summary | 0.478 | 0.450 |
| Education | 0.784 | 0.811 |
| Experience | 0.911 | 0.865 |
| Skills | 0.533 | 0.665 |
| Professional | 0.531 | 0.176 |
| Statements | 0.460 | 0.452 |

For each section type in Chart 2, "precision" indicates the fraction of labels assigned that are assigned correctly. High precision indicates low false positives. "Recall" indicates the fraction of terms that should have been labeled as belonging to a given segment that were correctly labeled. High recall indicates low false negatives.

The overall token-labeling accuracy of this model, which is the fraction of document terms that were correctly labeled, was 0.766. The overall performance is due to the HMM's extreme simplicity. With more elaborate models that contain hundreds of states and are trained to extract much finer-grained detail from resumes, overall accuracy in the 95%+range is achieved in recognizing top-level sections.

The same trained model was run on the same 200 resumes with absolute restrictions on section re-entry (corresponding to a re-entry discount factor of 0) for seven of the top-level sections (the "Statements" section was left unconstrained) using the modified Viterbi algorithm previously described. It obtained the following performance:

CHART 3

| Section | Precision | Recall |
|---|---|---|
| Contact | 0.836 | 0.920 |
| Objective | 0.616 | 0.607 |
| Summary | 0.434 | 0.417 |
| Education | 0.836 | 0.840 |
| Experience | 0.915 | 0.932 |
| Skills | 0.670 | 0.659 |
| Professional | 0.591 | 0.249 |
| Statements | 0.455 | 0.598 |

The modified algorithm improved the overall accuracy of this model to 0.804. A few sections dropped slightly in recall, as might be expected due to using absolute restriction rather than penalization (for example, many resumes contain a copy of the Contact section at the top of every page of the resume), but for other sections recall improves, and precision improves for nearly all sections.

Optimizing Re-Entry Penalties

Determining Parameters

The previous results arose from using absolute restriction on re-entry to seven resume sections; in general, it is preferable to determine whether absolute restriction (a discount factor of 0) or penalization (a discount factor greater than 0) is best for each constraint. But when several simultaneous re-entry constraints are added to a model, determination of the optimal penalties for each constraint quickly becomes more difficult. One way to determine a good set of penalties is to optimize each individual penalty in isolation and combine the results in a final model. The following data describes the performance impact of variable penalization for the eight top-level resume sections modeled in the previous experiment. For each section, re-entry penalization was applied with a discount factor of $2^p$, $p \in \{0,-5,-1, \ldots ,-45\}$, and compared, in performance, with absolute restriction. FIGS. 3A–3D show, for four of the eight top-level sections, how precision, recall, and accuracy vary with the re-entry discount factor.

The charts of FIGS. 3A–3D give good heuristics for how each resume section can be constrained. The Education, Experience, and Skills sections all benefit from constraint, and full prohibition does not appear to degrade performance significantly, so re-entry prohibition is recommended for these sections. The Professional and Statements sections do not recognize a similiar benefit from constraint, so these sections are preferably not constrained at all. Intermediate penalties are preferable for the Contact, Objective, and Summary sections.

Chart 4, below, identifies a different set of discount factors used to investigate the performance of the present method and systems.

| Section | "Optimal" Discount Factor |
|---|---|
| Contact | $2^{-40}$ |
| Objective | $2^{-5}$ |
| Summary | $2^{-5}$ |
| Education | 0 |
| Experience | 0 (prohibition) |
| Skills | 0 (prohibition) |
| Professional | 1 (no constraint) |
| Statements | 1 (no constraint) |

Use of the above listed discount factors, which are nearer to optimal resulted in the following performance detailed in Chart 5:

CHART 5

| Section | Precision | Recall |
|---|---|---|
| Contact | 0.816 | 0.954 |
| Objective | 0.634 | 0.706 |
| Summary | 0.434 | 0.417 |
| Education | 0.838 | 0.840 |
| Experience | 0.921 | 0.927 |
| Skills | 0.670 | 0.659 |
| Professional | 0.569 | 0.271 |
| Statements | 0.466 | 0.578 |

The overall accuracy for this model is 0.808, better than for the fully restricted model. Predictably, for the unconstrained sections (Professional and Statements), the model's precision drops and its recall increases. For the penalized, rather than restricted, sections (Contact, Objective, and Summary), recall increases, as expected. For the restricted sections (Education, Experience, and Skills), performance is nearly the same as in the fully restricted model. The model can be further improved with additional search of penalty parameter space.

Efficiency

Structural knowledge has been successfully imposed, in particular state re-entry penalization, by modifying the Viterbi algorithm. Applying these re-entry constraints comes at a cost, however. The expansion of the state space in the Viterbi dynamic programming recurrence results in an algorithm requiring time and space exponential in the number of re-entry-constrained groups.

Many embodiments, variations, and improvements on the method disclosed are contemplated within the scope of the inventive method. The algorithm as described can be optimized somewhat to improve time and space performance. For example, it is not necessary to store the entire $\delta$ table in memory; only the entries for time t and t–1 are needed at any time slice. In addition, various approaches can be taken to reduce the overall running time. These approaches are described individually, but can be invoked in combination.

Single Versus Multiple Passes

An unconstrained HMM will often produce a maximum likelihood path that obeys the re-entry constraints of interest. In such cases, there is no need to invoke re-entry penalization. This method is illustrated in FIG. 1. A resume being labeled is run through an HMM using the unmodified Viterbi algorithm 110. The system checks to see if more than one section of a particular kind was found 115 (such as Education, or Experience, or Skills). If not, then the labeling is considered finished in that regard, and the system moves to its next task 125. If more than one Education section was found, the resume is run through the HMM again, this time using the modified Viterbi algorithm to apply a re-entry penalty 120, and then the system moves to its next task 125.

Chart 6 below illustrates the overall time savings produced by implementing a multi-pass process (in this case, a 2-pass process) in the example of resumes where one wants to restrict multiple Education sections from being identified. The first entry indicates average running time of unconstrained Viterbi. The second entry indicates the average running time when re-entry penalization is applied to all documents. The third entry indicates the average running time using a 2-pass process, whereby the document is initially labeled with the unconstrained Viterbi algorithm, and the constrained version is run only for those documents where multiple Education sections were identified.

CHART 6

| Implementation | Average per resume running time |
| --- | --- |
| No Re-entry Penalization | 2.2 seconds |
| Re-entry Penalization applied (Education section): 1 pass | 3.7 seconds |
| Re-entry Penalization applied (Education section): 2 pass | 2.8 seconds |

The average per document running time benefit is clear in this example. But there are potential trade-offs. First, the coding of the multi-pass process can be more complicated. Second, the overall running time for documents that have to go through both the unconstrained and constrained Viterbi is increased, and this may be unacceptable in certain interactive settings.

Anchoring After Verification

The description of re-entry penalization provided thus far relates to structural knowledge across the corpus of resumes. Advantage can also be taken of knowledge regarding a specific document to improve both quality and running time. In a variation on the multi-pass process described above, after a document has been labeled by an unmodified Viterbi algorithm 110, rather than running a subsequent modified Viterbi algorithm with a re-entry penalty 120, an interactive user indicates which of the sections is correctly labeled 130. The verified labels are anchored 135, and an unmodified Viterbi algorithm is run 110 again.

This concept of anchoring verified labels 135 is useful in general. Verification can be accomplished by the use of automated heuristics or by interactive human input 130, with specific tagging prior to running the HMM.

Hierarchical Schema

In some examples, including resumes, multiple levels of mark-up exist. For example, within the Experience section, it may be preferred to identify "job events"; and within each job event, to tag fields such as Company-Name, Job-Start-Date, Job-End-Date, Title, Job-Description.

For such cases, in which re-entry into a top-level section is restricted, the modified Viterbi algorithm can penalize re-entry into a set of states corresponding to the top-level section. To improve efficiency in situations where such a rich hierarchical mark-up structure exists, a multi-tiered family of HMMs can be developed, one to address the top-level tagging and then additional modules to perform deeper mark-up. In the context of re-entry penalization, reducing the complexity of a given HMM can thereby help reduce the running-time impact of the constrained Viterbi. Even in the context of unconstrained Viterbi, such a multi-tiered structure can allow for more efficient and customized tagging of the various components of the document.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method for improving a Hidden Markov model (HMM) based mark-up system, the method including the steps of:
   a. constructing a HMM defining a plurality of states;
   b. modifying a Viterbi algorithm, related to the HMM, in order to apply a multiplicative factor if a particular state is re-entered; and
   c. executing the modified Viterbi algorithm against at least one information source.

2. The method according to claim 1 further comprises the steps of:
   d. identifying a number of times each state is re-entered; and
   e. applying the multiplicative factor based on the identified number of times the state has been re-entered.

3. The method according to claim 2, wherein different multiplicative factors are applied for different numbers of re-entry times.

4. The method according to claim 1, further comprising the steps of:
   d. marking-up the at least one information source, wherein the source is a resume.

5. The method according to claim 1, further comprising the steps of:
   d. determining an optimal multiplicative factor for each particular state independent of the other states.

6. The method according to claim 1, further comprising the steps of:
   d. separating the particular state into a plurality of sub-states; and
   e. modifying the Viterbi algorithm in order to apply a sub-state multiplicative factor if a particular sub-state is re-entered.

7. The method according to claim 1, wherein re-entry is constrained on local fragments of the at least one information source, rather than the whole at least one information source.

8. The method according to claim 1, wherein the multiplicative factor is a reward factor to increase the likelihood that the particular state is re-entered.

9. The method according to claim 1, wherein the multiplicative factor is a reward factor to require that the particular state is re-entered.

10. The method according to claim 1, wherein the multiplicative factor is a penalty factor to decrease the likelihood that the particular state is re-entered.

11. The method according to claim 1, wherein the multiplicative factor is a penalty factor to prohibit that the particular state is re-entered.

12. A method of improving a Hidden Markov model (HMM) segmentation system comprising the steps of:
   a. receiving a data sequence to be segmented;
   b. invoking a Viterbi algorithm to label the received data sequence into a plurality of segment types;
   c. if a segment type is identified more than once during labeling, verifying which identification is correct;
   d. anchoring, within the data sequence, labels verified as being correct; and
   e. invoking the Viterbi algorithm to label the data sequence, including the anchored labels, into the plurality of segment types.

13. A multi-pass method for improving results of a Hidden Markov model (HMM) based segmentation system, comprising the steps of:
   a. receiving a data sequence to be segmented;
   b. invoking a Viterbi algorithm to label the received data sequence into a plurality of segment types; and
   c. if a segment type is identified more than once during labeling, invoking a modified Viterbi algorithm to label the received data sequence into the plurality of segment types; wherein the modified Viterbi algorithm imposes a constraint regarding re-entry into a particular state of the HMM.

14. The method according to claim 13, wherein the step of invoking the modified Viterbi Algorithm further includes the steps of;
  d. determining which respective state of the HMM corresponds to each of the segment types identified more than once during labeling; and
  e. invoking the modified Viterbi algorithm with respect to only the determined states of the HMM.

15. The method according to claim 13, wherein the constraint penalizes entry into a particular state.

16. The method according to claim 13, wherein the constraint encourages entry into a particular state.

17. A method for improving a Hidden Markov model (HMM) based mark-up system, the method including the steps of:
  a. constructing an HMM defining a plurality of hierarchically arranged states;
  b. modifying a Viterbi algorithm, related to the HMM, in order to apply a first multiplicative factor if a first state of the HMM is re-entered and to apply a second multiplicative factor if a second state of the HMM is re-entered, wherein the second state is at a second hierarchical level under the first hierarchical level of the first state; and
  c. invoking the modified Viterbi algorithm against at least one information source.

18. A method for improving a conventional Viterbi algorithm, the method comprising the step of modifying the determination of $\delta$ and $\phi$ of the conventional Viterbi algorithm such that:
  a. for each state $i \in \{1, \ldots, N\}$,
    i. if state i is in re-entry group k,
      a) $\delta_1(i,G^k) = \pi_i \times b_i(O_1)$; for all $G \neq G^k$, $\delta_1(i,G) = 0$, and
      b) For all G, $\phi_i(i,G) = 0$;
    ii. otherwise, if state i is not in any re-entry group k,
      a) $\delta_1(i,G^0) = \pi_i \times b_i(O_1)$; for all $G \neq G^0$, $\delta_1(i,G) = 0$, and
      b) For all G, $\phi_1(i,G) = 0$; and
  b. for time t=2 to T,
    iii. for each state $i \in \{1, \ldots, N\}$,
      a) for each re-entry state G,
        1) $\delta_t(i,G) = \max_{1 \leq j \leq N} \{\delta_{t-1}(j,G') \times a_{ji} \times d(G',i,j)\} \times b_i(O_t)$, and
        2) $\phi_t(i,G) = \operatorname{argmax}_{1 \leq j \leq N} \{\delta_{t-1}(j) \times a_{ji} \times d(G',i,j)\}$,
  C. wherein $G_k$, for each re-entry group k, denotes the current number of entries into that particular re-entry group; G denotes a re-entry state comprising a set of values for all $G_k$; $G^k$ denotes the re-entry state consisting of zeroes for all re-entry groups except k and a one for group k; and G' denotes the re-entry state j that would have led to re-entry state G when moving from state j to state i.

* * * * *